United States Patent [19]
Richmond

[11] 4,122,452
[45] Oct. 24, 1978

[54] JAMMING SIGNAL CANCELLATION SYSTEM

[75] Inventor: Martin R. Richmond, Lexington, Mass.

[73] Assignee: Sanders Associates, Inc., Nashua, N.H.

[21] Appl. No.: 491,587

[22] Filed: Jul. 22, 1974

Related U.S. Application Data

[63] Continuation-in-part of Ser. No. 451,324, Mar. 12, 1974, abandoned.

[51] Int. Cl.² ............................................. G01S 7/36
[52] U.S. Cl. ................................... 343/18 E; 325/474
[58] Field of Search ............... 343/18 E; 325/65, 473, 325/474

[56] References Cited

U.S. PATENT DOCUMENTS

| | | | |
|---|---|---|---|
| 3,011,053 | 11/1961 | Sev | 343/18 E X |
| 3,118,140 | 1/1964 | Vladimir et al. | 343/18 E X |
| 3,597,762 | 8/1971 | DiMatteo | 343/18 E |
| 3,769,591 | 10/1973 | Brown et al. | 325/474 |
| 3,843,928 | 10/1974 | Nishimura et al. | 325/65 X |
| 3,950,751 | 4/1976 | Orr et al. | 343/18 E |

*Primary Examiner*—T.H. Tubbesing
*Attorney, Agent, or Firm*—Louis Etlinger; Richard I. Seligman

[57] ABSTRACT

Improved radar system performance in a jamming environment is achieved by applying the received signal containing both the desired radar signal and a higher level FM jamming signal to a radar receiver only during the time when the instantaneous frequency of the jamming signal is not at or within prescribed limits of the radar frequency.

22 Claims, 4 Drawing Figures

JAMMING SIGNAL CANCELLATION SYSTEM

This application is a continuation-in-part of my application Ser. No. 451,324, filed Mar. 12, 1974, now abandoned.

BACKGROUND OF THE INVENTION

An important consideration in the design of radar systems, particularly those for military applications, is the provision of means for recovering radar signals from a total signal which includes noise jamming signals of higher intensity than that of the signal itself. Most noise jammers consist of an oscillator which is frequency modulated by a noisy waveform at high rates. The rates are high enough to shock-excite the victim radar i.f. amplifier so that its output is undistinguishable from true random noise.

Many techniques have been used to attempt elimination of the effects of such jamming signals, for example, side-lobe cancellers and the so-called Dicke Fix.

Side-lobe cancellers reduce interference in antenna side-lobes while not improving any interference in the main lobe. The side-lobe cancellers are also relatively costly since extensive modification must be made to a radar installation including the addition of another antenna and receiver.

The Dicke Fix is used to reduce degradation in the radar display, however, the signal to jam (S/J) ratio is not improved.

SUMMARY OF THE INVENTION

Accordingly, it is an object of this invention to provide improved means for reducing the effects of "noise" jamming on radar.

It is another object of this invention to provide a radar system having improved S/J ratio.

It is a further object of this invention to provide improved radar performance in a jamming environment over all aspect angles.

An anti-jamming radar having very high jamming rejection even in the main beam is provided inexpensively. No antenna modification is necessary nor is the equipment critical to adjust. The technique works with all types of radar waveforms. Briefly, a broadband discriminator is used to make an instantaneous frequency measurement of the FM jamming signal. The discriminator is centered on the radar frequency and two high-speed threshold comparators determine when the jammer frequency is within (or near) the radar receiver passband. Whenever the discriminator output is between these limits, a switch, coupling the input signal to the radar receiver, is turned off. Since the discriminator output will also be zero in the absence of jamming, a third comparator is provided to detect this condition and keep the switch "on".

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
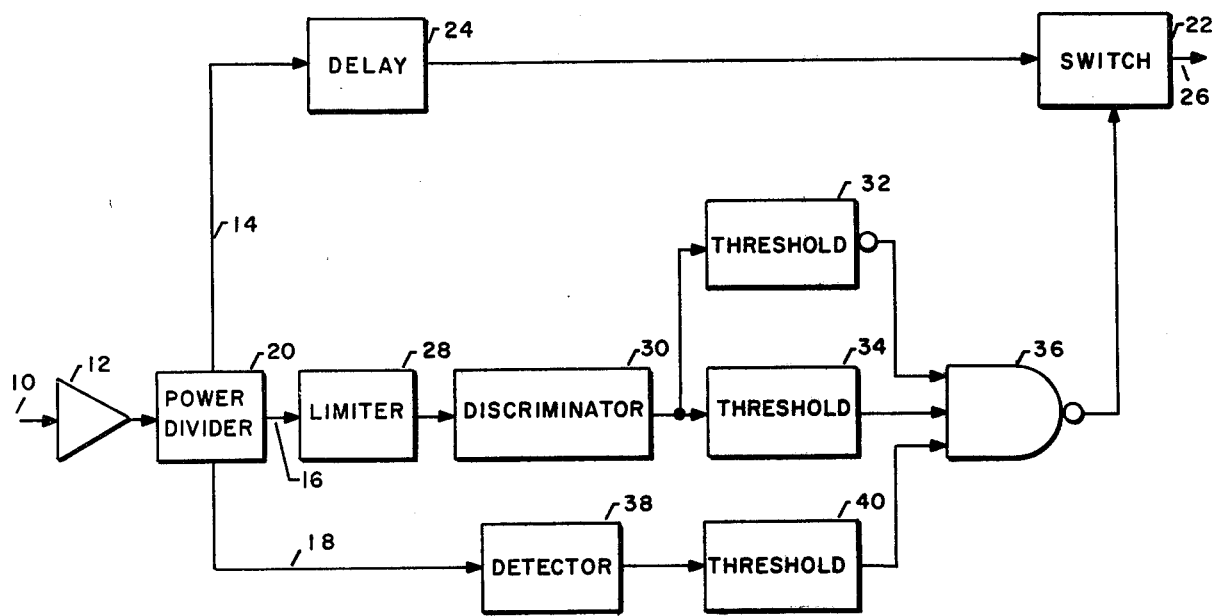
FIG. 1 is a circuit block diagram of the invention.

A system for reducing the effects of "noise" jamming on a radar is shown in FIG. 1. The system is inserted in front of the conventional radar receiver and may be operated either at the radar r.f. or, by translation and re-translation, at a convenient i.f.

The input signal at a line 10, which includes a desired radar signal plus an FM noise jamming signal of higher intensity, which noise jamming signal may also include AM, is amplified by amplifier 12 and split into three paths 14, 16 and 18 by a power divider 20.

The signal on path 14 is applied to a switch 22 via a delay line 24. The output from switch 22 on line 26 is the signal applied to the radar receiver.

The signal on path 16 is applied to a limiter 28, the output from which is coupled to a broadband discriminator 30. Discriminator 30 is centered on the radar frequency. Two high-speed threshold comparators 32 and 34 receive the output from discriminator 30 with the outputs from the threshold comparators being applied to a NAND gate 36. The output from NAND gate 36 is coupled to switch 22 to operate same.

The signal on path 18 is applied to a detector 38 whose output is coupled to a threshold circuit 40. The output from threshold circuit 40 is applied as a third input to NAND gate 36.

The object of this system is to effectively turn off the radar receiver whenever the frequency of the jamming signal is close to the radar signal frequency. That is, if the instantaneous frequency of the FM jamming signal is within the radar receiver passband (including the skirts), the receiver is turned off. Of course, the radar signal is lost for this period of time. At other times when the instantaneous frequency of the FM jamming signal is significantly different from that of the radar signal frequency the radar signal is applied to the receiver along with the jamming signal which is out of the passband of the receiver.

The input signal to the system will pass to the receiver via path 14 when the switch 22 is closed.

The input signal on path 16 is normalized in amplitude by limiter 28 and the instantaneous frequency thereof is measured by broadband discriminator 30 which is centered on the radar frequency. The two high speed threshold comparators 32, 34 determine when the jammer frequency is within predetermined limits about the radar center frequency. These limits are set somewhat wider than the radar 3dB bandwidth. Whenever the output from the discriminator is between these limits, an output from NAND gate 36 will turn switch 22 off.

Since the discriminator output will be zero in the absence of jamming, a third comparator is provided to detect this condition and keep the switch on. Detector 28 detects the input signal and a third input to NAND gate 36 is provided when the detected signal exceeds the threshold as determined by threshold comparator 40. This threshold will be exceeded only when a strong jamming signal is present.

Figure 2:
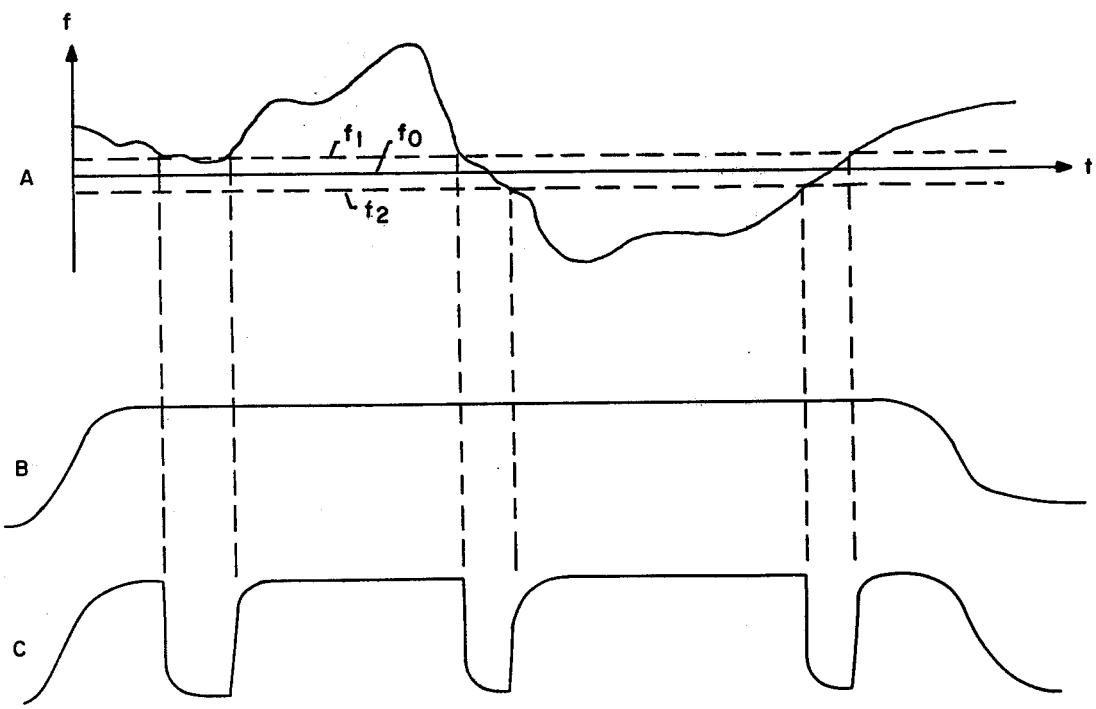
FIG. 2 is a series of waveforms illustrating operation of the circuit of FIG. 1.

The above description is illustrated by the waveforms of FIG. 2 wherein curve A is an exemplary frequency versus time plot of a jamming signal at input 10, curve B is an amplitude versus time plot of the radar signal at input 10 and curve C is an amplitude versus time plot of the signal applied on line 26 to the radar receiver. It is seen that when the instantaneous frequency of the jamming signal is between frequencies $f_1$ and $f_2$ centered about the radar frequency $f_0$, switch 22 is opened and that portion of the radar signal does not pass to the receiver as shown in waveform C.

For typical jammer parameters the switching times of switch 22 will be quite short so that, as shown in waveform C of FIG. 2, the effect will be to chop holes rather than cause missing pulses. Assume a jammer with 10 MHz deviation at a 5 MHz modulation rate. The maximum slope will be about 300 MHz/$\mu$s. If the window width ($f_1$ to $f_2$) is 3 MHz, the switch "off-time" will be 10 ns. Thus, the switch and driver must be capable of transition times on the order of 1 ns. The delay in the logic is much less important as long as it is consistent; it is simply compensated by a suitable delay 24 such an extra length of cable.

AM on the jammer, whether correlated with the FM or not, has no effect, since the limiter 28 removes it.

The loss in desired signal amplitude due to the holes chopped in the pulse is equal to the ratio of window width to total jammer spectrum width. It will generally be a small percentage. The fluctuation in this loss will introduce AM on the pulse which will limit MTI performance. However, since several holes will be averaged per pulse width, this will be a still smaller percentage.

Although detector 38 is shown preferably coupled to power divider 20 it may instead be coupled to the output of limiter 28.

The threshold circuits operate when a particular amplitude is exceeded. Since the input signals thereto are analog, Schmitt triggers are the preferred embodiments for such threshold circuits.

Detector 38 is preferably a conventional diode detector and should be slow enough not to operate the threshold 40 on strong radar signals, or else the threshold should be set high enough to prevent this. STC may be provided.

Switch 22 is preferably a Shottky diode switch.

The present invention provides good interference rejection capability without the need for AGC.

In addition to the radar use described hereinbefore the invention is also useful in ECM (electronic countermeasures) applications. Conventionally an ECM jammer is periodically shut off so that an ESM (electronic support measures) receiver can look at the radar which is being jammed to see if it is still operating at the jamming frequency or at a different frequency, thus, requiring shift in the jamming frequency. During this period the jammer aircraft is vulnerable since the radar is permitted a clear look.

The present invention can be employed with such ESM receiver and, thus, eliminate the requirement of shutting off the jammer to accomplish look-through. In fact, continuous look-through can be achieved with a continuous monitoring of the radar frequency.

In the system of FIG. 2 holes, or gaps, occur in the radar pulse. These tend to be quite short compared to a pulse width, and many such gaps would likely occur during a pulse width.

The effect of these gaps is a negligible reduction in pulse amplitude, but since the process is random, the reduction in pulse amplitude will not necessarily be the same from pulse to pulse.

This results in a noise-like pulse amplitude modulation which could cause reduction in sub-clutter visibility in an MTI or coherent radar: The reduction in sub-clutter visibility being a direct function of the clutter amplitude and the random percentage modulation by the process described above.

In order to partially or fully circumvent this potential reduction in performance, a form of "RF BOXCAR" is used, in which a short delay line "remembers" a short portion of the radar information, say 10 nanoseconds, and inserts that information into the radar receiver channel during the time the switch is in the "open" position.

Figure 3:
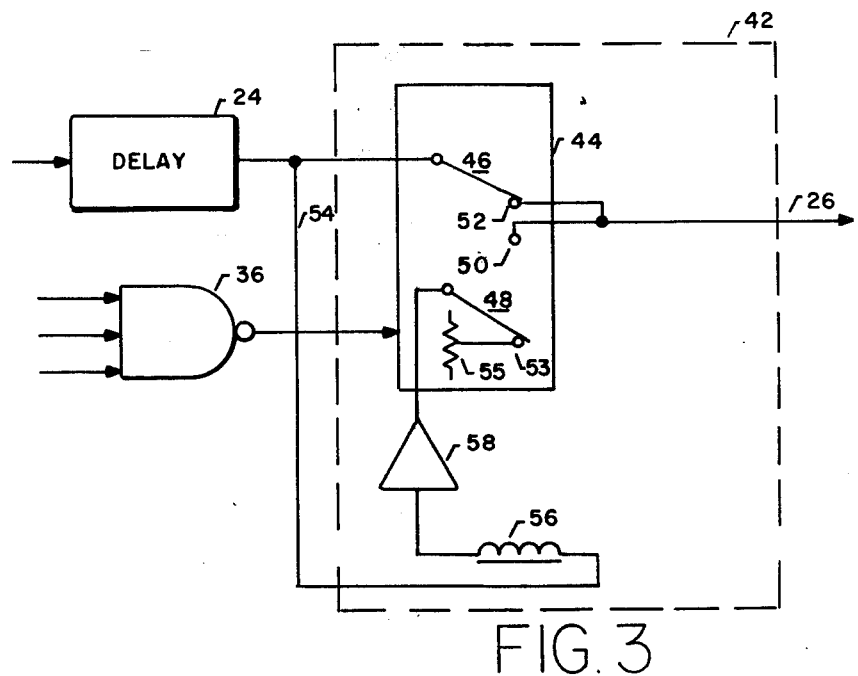
FIG. 3 is a circuit block diagram of an improvement to invention shown in FIG. 1.

This is shown in FIG. 3 wherein only the changes from FIG. 2 are illustrated. This embodiment is identical to that of FIG. 2 but replacing switch 22 with that enclosed by dashed lines 42.

The output from delay 24 is applied to a switch arrangement 44 having two sets of contacts: a single pole-single throw set 46 and a single pole-double throw set 48. Although the contact arrangements are shown as mechanical, it is obvious that electronic switching circuitry can be substituted therefor and the mechanical connections are shown for clarity. The switch 44 is operated by an output from NAND gate 36 in the same fashion switch 22 was operated in the embodiment of FIG. 2. The output of switching arrangement 26 is applied to the radar receiver or ESM receiver as the case may be from contact 50 of contact set 48 and contact 52 of contact set 46. Contact 53 of set 48 is connected to a dummy load 55.

A portion of the signal from line 26 is sampled via a coupler 54 and applied to a delay line 56. Delay line 56 is coupled to the arm of contact set 48 via an amplifier 58.

When the contacts of switch 44 are in the position shown, the incoming signal via delay 24 is applied to a receiver via line 26 and at the same time a portion of this signal is applied to delay line 56.

When the instantaneous frequency of the jamming signal is such that the contacts of switch 44 are switched to their alternate position by an output from NAND gate 36, the delayed signal from delay line 56 is applied to the line 26 to fill in the gaps.

Since the radar energy is narrow band the phase of the energy in the band is quite consistent over the pulse length. Hence, delay line 56 can be adjusted to be a normal delay of an integral number of RF wavelengths at the radar frequency, and thus the output of the line will be consistent in phase with the signal which had just been switched "off".

The effect of this arrangement is to prevent loss of amplitude due to the switching "holes" and consequently, reduce or eliminate the random variation in amplitude from pulse-to-pulse. Subclatter visibility will therefore be significantly improved.

One problem with this improvement is the selection of the delay length of delay line 56. For moderate line lengths, the gaps in the signal applied to a receiver may not be completely filled. If the delay length of delay line 56 is relatively large, there is an increased risk that the signal applied from the delay line, when switching occurs, may include a sample of a time corresponding to a previous hole which may present the jamming signal to the receiver. The larger the length of delay line 56 the more likely this could occur.

Figure 4:
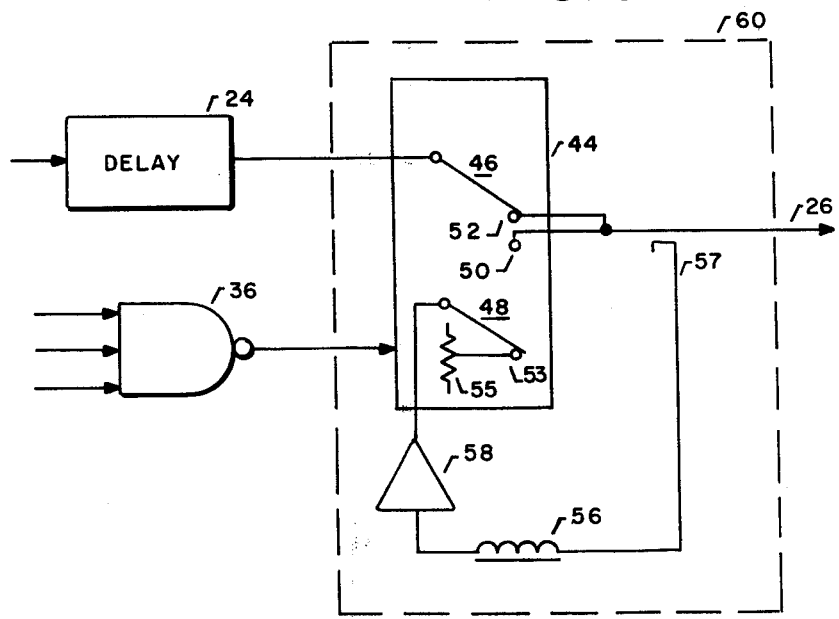
FIG. 4 is a circuit block diagram which illustrates an alternative to the improvement of FIG. 3.

FIG. 4 is an alternative approach to that of FIG. 3. In this embodiment the input to delay line 56 is taken after switch 44 via a coupler 57. In this embodiment, the jamming signal can never be loaded into delay line 56 since switch 44 is always open when a jamming signal is present and, thus, the risk of ever passing a jammming signal is avoided. This embodiment also permits complete filling of any gap even if the gap is much greater than the delay line length because the signal will recirculate in the delay line.

Although the invention has been described as it relates to improved radar system performance in a jamming environment, the principles of the invention apply equally to any communication system which is hampered by intentional jamming signals or other strong interfering signals. Thus, it is to be understood that the embodiments shown are illustrative only and that many variations and modifications may be made without departing from the principles of the invention herein disclosed and defined by the appended claims.

I claim:

1. Apparatus for receiving desired signals from an output signal which includes interfering signals of higher intensity, comprising:
    switching means for coupling the input signal to a receiver;
    means for applying the input signal to said switching means;
    means for measuring the absolute instantaneous frequency of the interfering signal;
    means coupled to said measuring means for determining if the measured absolute instantaneous frequency of the interfering signal is within prescribed limits; and
    means for "opening" said switching means when the frequency of the interfering signal is within said prescribed limits.

2. Apparatus as defined in claim 1, wherein said determining means includes first and second threshold comparators coupled to said absolute frequency measuring means, and said "opening" means includes means coupled to said first and second threshold comparators for providing an output to said switching means when the absolute instantaneous frequency of the interfering signal is within said predetermined limits.

3. Apparatus as defined in claim 2, further including means for determining when a strong interfering signal is present, and means for enabling said output providing means.

4. Apparatus as defined in claim 3, wherein said means for determining the presence of a strong interfering signal includes, a detector coupled to the input signal and a third threshold comparator coupled to said detector.

5. Apparatus as defined in claim 3, wherein said measuring means includes a broadband discriminator.

6. Apparatus as defined in claim 5, further including means for normalizing the amplitude of the input signal applied to said broadband discriminator.

7. Apparatus as defined in claim 6, wherein said normalizing means includes a limiter.

8. Apparatus as defined in claim 4 wherein said output providing means includes means for ANDing the outputs from said first, second and third threshold comparators.

9. Apparatus as defined in claim 4, wherein said threshold comparators are Schmitt trigger circuits.

10. Apparatus as defined in claim 1, wherein said switching means includes a Schottky diode switch.

11. Apparatus as defined in claim 1, further including means for remembering the input signal when said switching means is "closed" and means for coupling the input signal to a receiver from said remembering means when said switching means is "opened".

12. Apparatus for receiving non-cooperative radar signals proximate an active transmitter which is generating noise jamming signals of higher intensity, comprising:
    switching means for coupling the input signal containing the radar signals and noise jamming signals to a receiver;
    means for applying the input signal to said switching means;
    means for measuring the absolute instantaneous frequency of the jamming signal;
    means coupled to said measuring means for determining if the measured absolute instantaneous frequency of the jamming signals is within prescribed limits; and
    means for "opening" said switching means when the frequency of the interfering signal is within said prescribed limits.

13. Apparatus as defined in claim 12, wherein said determining means includes first and second threshold comparators coupled to said absolute frequency measuring means, and said "opening" means includes means coupled to said first and second threshold comparators for providing an output to said switching means when the absolute instantaneous frequency of the jamming signal is within said predetermined limits.

14. Apparatus as defined in claim 13, further including means for determining when a strong jamming signal is present, and means for enabling said output providing means.

15. Apparatus as defined in claim 14, wherein said means for determining the presence of a strong jamming signal includes, a detector coupled to the input signal and a third threshold comparator coupled to said detector.

16. Apparatus as defined in claim 14, wherein said measuring means includes a broadband discriminator.

17. Apparatus as defined in claim 16, further including means for normalizing the amplitude of the input signal applied to said broadband discriminator.

18. Apparatus as defined in claim 17, wherein said normalizing means includes a limiter.

19. Apparatus as defined in claim 14 wherein said output providing means includes means for ANDing the outputs from said first, second and third threshold comparators.

20. Apparatus as defined in claim 14, wherein said threshold comparators are Schmitt trigger circuits.

21. Apparatus as defined in claim 12, wherein said switching means includes a Schottky diode switch.

22. Apparatus as defined in claim 12, further including means for remembering the input signal when said switching means is "closed" and means for coupling the input signal to a receiver from said remembering means when said switching means is "opened".

* * * * *

UNITED STATES PATENT OFFICE
CERTIFICATE OF CORRECTION

PATENT NO. : 4,122,452
DATED : October 24, 1978
INVENTOR(S) : Martin R. Richmond It is certified that error appears in the above-identified patent and that said Letters Patent are hereby corrected as shown below:

Column 4, line 6, delete "say 10 nanoseconds,"

Column 4, line 28, change " line 26" to --delay 24--

Column 4, line 29, change "coupler" to --line--

Signed and Sealed this

Fifteenth Day of April 1980

[SEAL]

Attest:

SIDNEY A. DIAMOND

Attesting Officer     Commissioner of Patents and Trademarks